(12) United States Patent
Yoshikawa et al.

(10) Patent No.: US 8,035,272 B2
(45) Date of Patent: Oct. 11, 2011

(54) CARBON BRUSH WITH RAW GRAPHITE PARTICLES

(75) Inventors: Shouichi Yoshikawa, Kosai (JP); Fukumi Akatsu, Fukushima-ken (JP)

(73) Assignees: Asmo Co. Ltd., Shizuoka-Ken (JP); Hitachi Chemical Company Ltd., Tokyo (JP)

( * ) Notice: Subject to any disclaimer, the term of this patent is extended or adjusted under 35 U.S.C. 154(b) by 582 days.

(21) Appl. No.: 11/659,082

(22) PCT Filed: Aug. 1, 2005

(86) PCT No.: PCT/JP2005/014466
§ 371 (c)(1),
(2), (4) Date: Feb. 1, 2007

(87) PCT Pub. No.: WO2006/013991
PCT Pub. Date: Feb. 9, 2006

(65) Prior Publication Data
US 2009/0200893 A1 Aug. 13, 2009

(30) Foreign Application Priority Data
Aug. 2, 2004 (JP) ................. 2004-226146

(51) Int. Cl.
*H01R 39/20* (2006.01)
*H02K 13/00* (2006.01)
*H01R 39/18* (2006.01)
*H01R 39/22* (2006.01)
*H01R 39/26* (2006.01)

(52) U.S. Cl. ........ 310/253; 310/248; 310/249; 310/251; 310/252

(58) Field of Classification Search ........... 310/251, 310/248, 249, 252, 253; H02K 13/00; H01R 39/24, H01R 39/18, 39/20, 39/22, 39/26
See application file for complete search history.

(56) References Cited

U.S. PATENT DOCUMENTS
4,084,669 A * 4/1978 Suwa et al. ............ 310/251
5,144,181 A * 9/1992 Shibuya ................. 310/251
(Continued)

FOREIGN PATENT DOCUMENTS
DE 42 04 680 4/1993
(Continued)

OTHER PUBLICATIONS
International Search Report of Application No. PCT/JP2005/014466 dated Dec. 14, 2005.

*Primary Examiner* — Quyen Leung
*Assistant Examiner* — Michael Andrews
(74) *Attorney, Agent, or Firm* — Pearl Cohen Zedek Latzer LLP

(57) ABSTRACT

A rotating electrical machine, which is a direct current motor, includes carbon brushes. Each carbon brush contains graphite grains, metal particles, and solid lubricant, which are sintered in a dispersed state. The graphite grains are each formed of granulated substance of raw graphite particles, and the particle diameters of the graphite grains are within a range of 60 to 280 μm. The surface of the granulated substance is coated with amorphous carbon made of carbides of organic binder. A plurality of holes are formed in each carbon brush. The dimension (maximum dimension) of the holes is less than half the average particle diameter of the raw graphite particles.

15 Claims, 9 Drawing Sheets

U.S. PATENT DOCUMENTS

| | | | |
|---|---|---|---|
| 5,447,681 A * | 9/1995 | Tai Seung et al. | 310/DIG. 2 |
| 5,480,695 A * | 1/1996 | Tenhover et al. | 428/408 |
| 6,609,452 B1 * | 8/2003 | McCormick et al. | 428/368 |
| 2001/0021686 A1* | 9/2001 | Rinn et al. | 501/99 |
| 2003/0141777 A1* | 7/2003 | Otani et al. | 310/251 |

FOREIGN PATENT DOCUMENTS

| | | |
|---|---|---|
| JP | 05-144534 | 6/1993 |
| JP | 2001-298913 | 10/2001 |
| WO | WO 0141167 A2 * | 6/2001 |
| WO | WO 2005/025034 | 3/2005 |

* cited by examiner

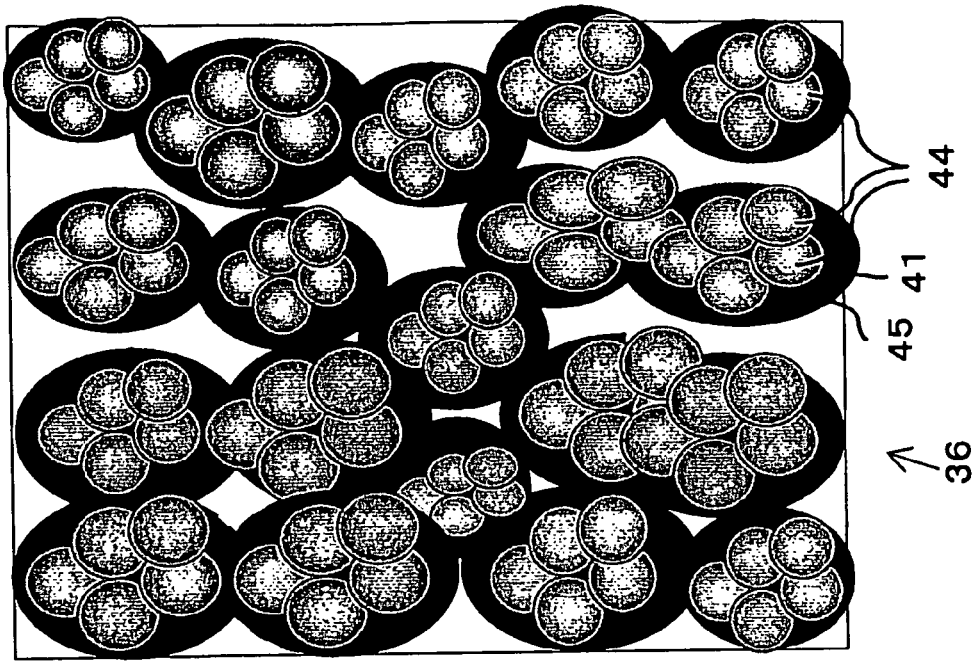
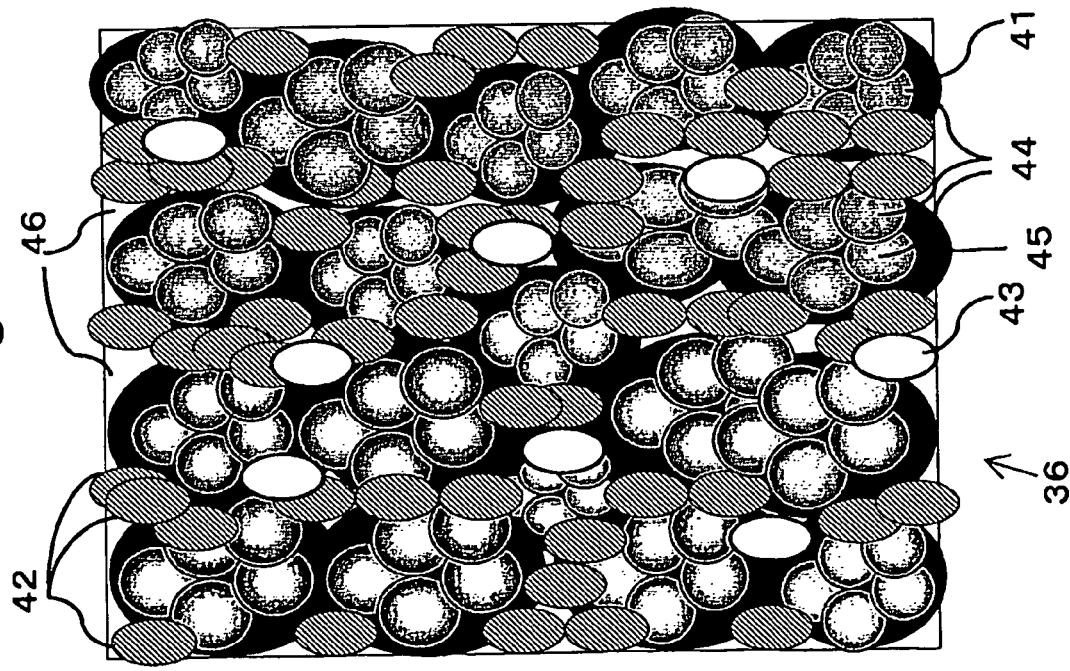

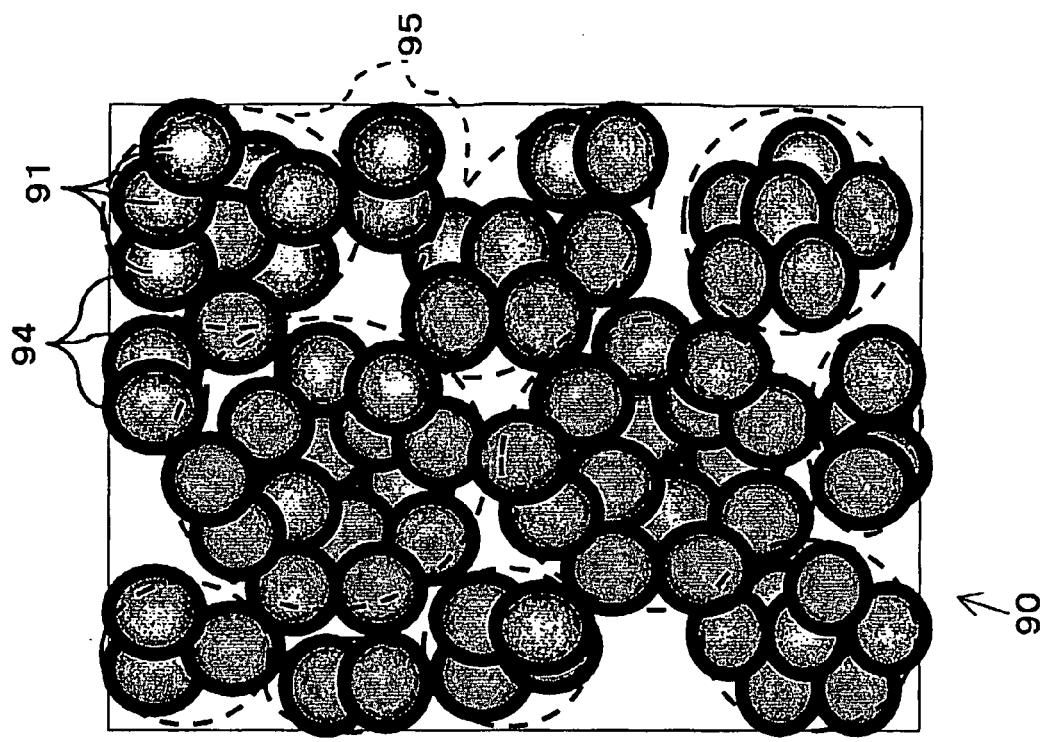
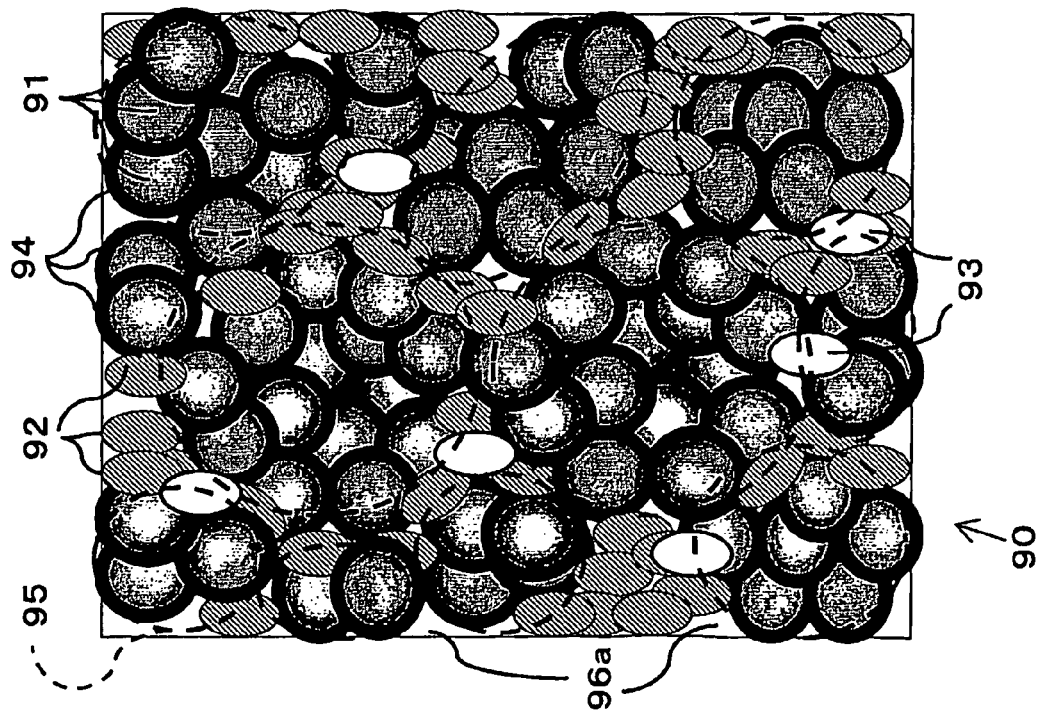

CARBON BRUSH WITH RAW GRAPHITE PARTICLES

CROSS-REFERENCE TO RELATED APPLICATIONS

This application claims priority from International Application PCT/2005/014466 filed Aug. 1, 2005, which in turn claims priority from Japanese application 2004-226146 filed on Aug. 2, 2004, both applications being incorporated by reference herein in its entirety.

FIELD OF THE INVENTION

The present invention relates to a power supplying carbon brush that is pressed against a commutator of a rotating electrical machine, and to the rotating electrical machine equipped with the carbon brush.

BACKGROUND OF THE INVENTION

In the prior art, carbon brushes used for supplying power in a rotating electrical machine and the like are manufactured through pressure molding of raw graphite particles, metal particles, particles of solid lubricant such as molybdenum disulfide ($MoS_2$), and organic binder, and calcining of the molded product. As schematically shown in FIG. 9A, a conventional carbon brush 90 has a configuration in which raw graphite particles 91, metal particles 92, and particles of solid lubricant 93 are dispersed. The raw graphite particles 91 are produced through, for example, a method in which graphitizing material is subjected to a high-temperature treatment to obtain graphitized material, and the graphitized material is then ground into powder, or a method in which graphitizing material is ground and then subjected to a high-temperature treatment to obtain graphitized material. The raw graphite particles 91 having various particle diameters can be produced depending on the degree of grinding. The raw graphite particles 91 having the average particle diameter of approximately 30 μm are used as raw material for the carbon brush 90 having reliable performance. Copper particles are used as the metal particles 92 in a suitable manner since the copper particles have high conductivity.

In the conventional carbon brush 90, carbide 94 of the organic binder coats the surface of each raw graphite particle 91. Furthermore, a number of the raw graphite particles 91 are adhered to one another to form graphite grains 95. The carbide 94 of the organic binder is depicted with thick black lines coating the outer circumferences of all the raw graphite particles 91 in the drawing. Each graphite grain 95 is configured by a number of the raw graphite particles 91 located in a region surrounded by a dashed line in the drawing. Furthermore, according to the carbon brush 90, binder (not shown) is applied to the outer surface of each graphite grain 95, thereby causing the graphite grains 95 to adhere to one another via the binder. In addition, the metal particles 92 and the solid lubricant particles 93 are dispersed in gaps among the graphite grains 95.

A metal graphite brush disclosed in, for example, Japanese Laid-Open Patent Publication No. 5-144534 is known as such a carbon brush 90. The metal graphite brush is formed through pressure molding of graphite powder and metallic powder, which are mixed with a predetermined compounding ratio, into a predetermined shape, and calcining of the molded product. Copper in the metal includes powder of microscopic particles and powder of large particles having 20 to 150 times the particle diameter of the powder of the microscopic particles. The compounding ratio of the powder of the microscopic particles to the powder of the large particles is 4:6 to 6:4. Since at least two types of blended powder, which are the powder of the microscopic particles and the powder of the large particles, are used as the metallic powder, which is one of the brush materials, the metal graphite brush suppresses sliding noise and self-excited vibration noise generated by frictional sliding between the metal graphite brush and a member along which the metal graphite brush slides. The metal graphite brush also has high specific resistance and long life (wear resistance).

According to the conventional carbon brush 90, however, the particle diameters of the graphite grains 95 vary in a wide range as shown in FIG. 9B. FIG. 9B shows a state where the metal particles 92 and the solid lubricant particles 93 are removed from the schematic diagram of FIG. 9A emphasizing the dispersed state of the graphite grains 95 and the raw graphite particles 91. The variation of the particle diameters of the graphite grains 95 causes large holes 96a and small holes 96b to exist simultaneously as shown by, for example, an electron microscopic picture of FIG. 3B. The holes 96a, 96b are spaces in which none of the raw graphite particles 91, the metal particles 92, the solid lubricant particles 93, the carbides 94 of the binder, and the graphite grains 95 exist.

The wide variation of the size and distribution of the holes 96a, 96b and the fact that the large holes 96a are easily formed leads to, for example, generation of a crack 97 as shown by the electron microscopic picture in FIG. 3D when a great load is applied to the carbon brush 90. This lowers the strength of the carbon brush 90. Furthermore, dispersing of the metal particles 92 tends to become uneven, which increases the possibility of various problems such as increasing voltage drop and frictional noise.

SUMMARY OF THE INVENTION

Accordingly, it is an objective of the present invention to provide a carbon brush that easily reduces voltage drop and suppresses frictional noise while extending the life, and to provide a rotating electrical machine.

To achieve the foregoing and other objectives and in accordance with the purpose of the present invention, a carbon brush containing graphite grains and metal particles is provided. The graphite grains and metal particles are sintered in a dispersed state. The graphite grains are each formed of granulated substance of raw graphite particles. The particle diameter of each graphite grain is within a range of 60 to 280 μm.

Another carbon brush containing graphite grains and metal particles is provided. The graphite grains and metal particles are sintered in a dispersed state. The graphite grains are each formed of granulated substance of raw graphite particles. The particle diameter of each graphite grain is less than or equal to ten times the average particle diameter of the raw graphite particles.

Further, the present invention provides another carbon brush containing graphite grains and metal particles. The graphite grains and metal particles are sintered in a dispersed state. The graphite grains are each formed of granulated substance of raw graphite particles. The average particle diameter of the graphite grains is less than or equal to five times the average particle diameter of the raw graphite particles.

Further, the present invention provides another carbon brush containing graphite grains and metal particles. The graphite grains and metal particles being sintered in a dispersed state. The graphite grains are each formed of granulated substance in which raw graphite particles are bound together. The surface of the granulated substance is coated with amorphous carbon.

According to another aspect of the present invention, a rotating electrical machine having the above carbon brush is provided.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is a schematic diagram illustrating the fine structure of the cut surface of the carbon brush according to the preferred embodiment;

FIG. 2B is a schematic diagram illustrating a state where the graphite grains in the schematic diagram of FIG. 2A are emphasized;

FIG. 9A is a schematic diagram illustrating the fine structure of the cut surface of a conventional carbon brush; and FIG. 9B is a schematic diagram emphasizing the graphite grains of the schematic diagram of FIG. 9A.

DETAILED DESCRIPTION

An electric power steering motor and a carbon brush located in the motor according to one embodiment of the present invention will now be described with reference to the drawings.

Figure 1:
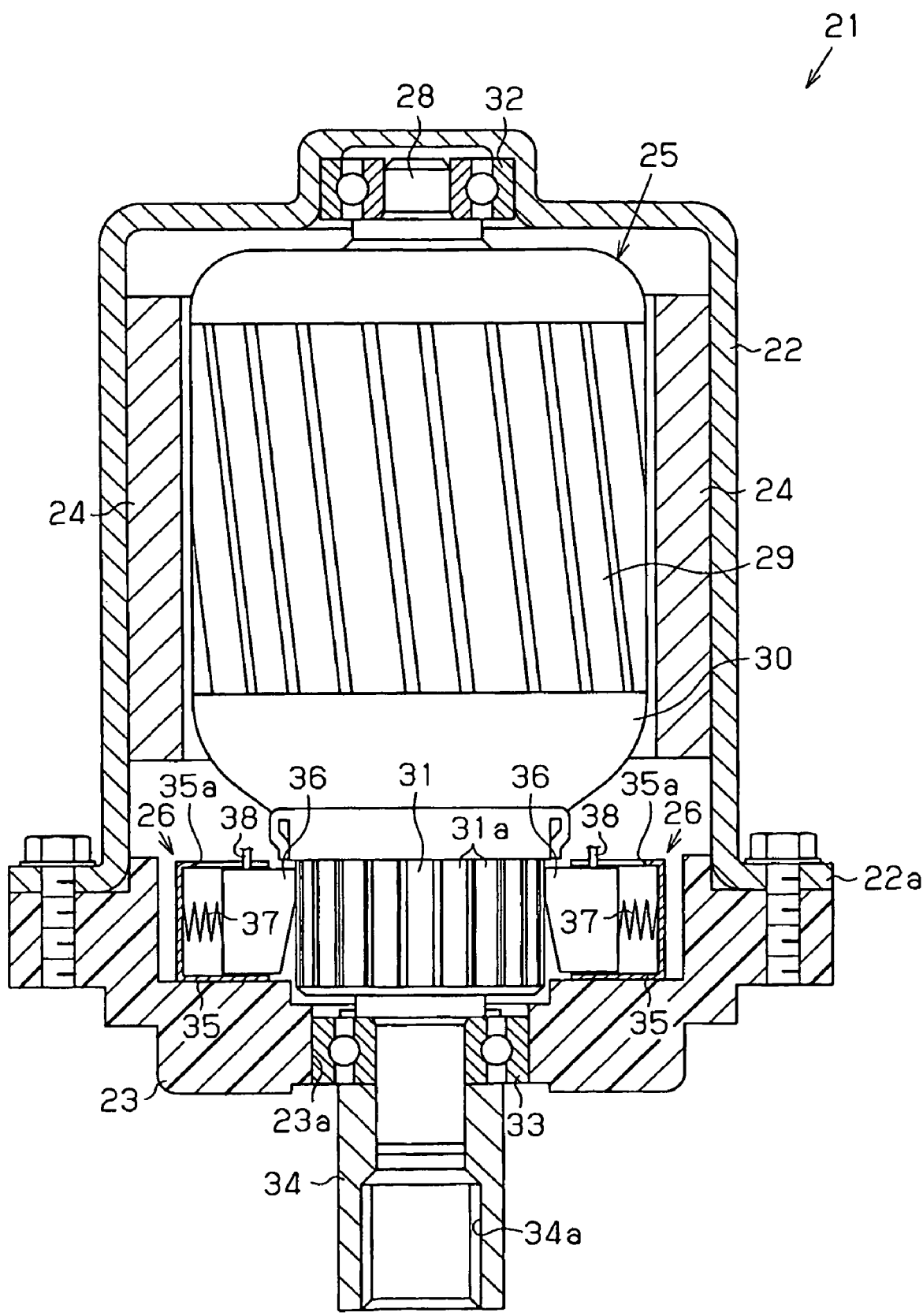
FIG. 1 is a schematic diagram illustrating a direct current motor according to one embodiment.

As shown in FIG. 1, a rotating electrical machine, which is a direct current motor 21 in this embodiment, includes a substantially cup-shaped yoke housing 22, an end frame 23, magnets 24, which are secured to the inner circumferential surface of the yoke housing 22, and an armature 25 and a pair of brush devices 26, which are accommodated in a space defined by the yoke housing 22 and the end frame 23. An opening portion of the yoke housing 22 is secured to the peripheral portion of the end frame 23 via a flange portion 22a, which extends radially outward. The end frame 23 is substantially disk-shaped and a center bore 23a is formed at its center.

The armature 25 includes a rotary shaft 28, a core 29, which is secured to the rotary shaft 28, a coil 30, which is wound about the core 29, and a commutator 31, which is secured to a section of the rotary shaft 28 close to the end frame 23. The upper end of the rotary shaft 28 is supported by a bearing 32 located at the center of closed end of the yoke housing 22, and the lower end of the rotary shaft 28 is rotatably supported by a bearing 33, which is secured to the inner circumference of the center bore 23a of the end frame 23. The lower end of the rotary shaft 28 projects outside through the center bore 23a while being rotatably supported by the bearing 33. A fitting member 34 is secured to the lower end portion of the projecting rotary shaft 28. The fitting member 34 has a fitting recess 34a for fitting with an external rotated shaft (a steering shaft in this embodiment), which is not shown, to be engaged in the rotation direction. The commutator 31 is substantially cylindrical and includes segments 31a on its outer circumferential surface. Each segment 31a is electrically connected to the coil 30.

The brush devices 26 are located on the end frame 23 adjacent to the commutator 31. The brush devices 26 are located at intervals of 180 degrees along the circumferential direction of the commutator 31. Each brush device 26 includes a brush holder 35, a carbon brush 36, and a coil spring 37. Each brush holder 35 is cup-shaped and has a substantially rectangular cross-sectional shape. Each brush holder 35 is secured to the end frame 23 with the opening portion of the brush holder 35 facing the commutator 31. A draw out groove 35a is formed in the upper surface of each brush holder 35 extending along the longitudinal direction of the brush holder 35 (in the radial direction of the commutator 31 along the brush holder 35).

The carbon brushes 36 are substantially rectangular solids. Each carbon brush 36 is accommodated in one of the brush holders 35 between the side walls of the brush holder 35 with certain gaps from the side walls. The gaps are provided in consideration of the thermal expansion of the carbon brushes 36 caused by contact resistance between the carbon brushes 36 and the commutator 31 when the direct current motor 21 is driven for a long time period. Urging means, which is a coil spring 37, is located between the rear end face of each carbon brush 36 and the bottom portion of the corresponding brush holder 35 in a compressed state. Each coil spring 37 urges the corresponding carbon brush 36 toward the commutator 31 such that the distal end of the carbon brush 36 abuts against the outer circumferential surface of the commutator 31 (the segment 31a).

A power supplying lead wire, which is a pigtail 38 in this embodiment, is connected to the upper surface of each carbon brush 36 and projects outside of the corresponding brush holder 35 from the draw out groove 35a formed in the brush holder 35. The pigtail 38 is electrically connected to a direct current power source via a feed terminal, which is not shown. In the direct current motor 21, a drive current is supplied to the commutator 31 through the pigtails 38 and the carbon brushes 36, thereby rotating the armature 25 forward and backward.

The carbon brushes 36 are conductive bodies that rub against the commutator 31 and are used to form sliding contacts. When the distal end face of each carbon brush 36 is pressed against one of the segments 31a of the commutator 31, a drive current is supplied to the coil 30 through the segment 31a. The commutator 31 causes rectification that converts a direct current supplied from the direct current power source into an alternating current. Specifically, an electric current in the coil 30 is short-circuited during the pressurized contact between the carbon brush 36 and the segment 31a, which is then reversed by 180 electrical degrees in an extremely short time period from the instance of the short circuit until the short circuit is removed. The rectification occurs as the electrical current is repeatedly reversed. The pressurized contact between the carbon brush 36 and the segment 31a intermittently occurs in accordance with the rotation of the armature 25, which causes the short circuit to be established and removed repeatedly within a short cycle.

When the carbon brush 36 is pressed against the segment 31a, the voltage of current passing through the coil 30 after the abutment is made lower than that before the abutment (voltage drop). The voltage drop occurs due to a contact resistance between the carbon brush 36 and the segment 31a, which produces heat resulting in an energy loss. The voltage drop is reduced by increasing the content of metal particles 42 having high conductivity.

When the carbon brush 36 is pressed against the segment 31a, sliding friction acts between the carbon brush 36 and the segment 31a. As the sliding friction, that is, the friction coefficient $\mu$ between the carbon brush 36 and the segment 31a increases, vibration of the carbon brush 36 and noise or unusual sound of the direct current motor 21 are increased. The friction coefficient $\mu$ is proportional to the content of the metal particles 42 in the carbon brush 36.

The carbon brush 36 includes carbide that is produced by carbonization of the organic binder added during manufacture (pressure molding). When the carbon brush 36 is pressed against the segment 31a, the carbide adheres to the surface of the segment 31a, thereby becoming a cause of vibration of the carbon brush 36 or sparks. In other words, the carbon brush 36 that easily suppresses vibration and sparks is achieved by reducing the content of the organic binder.

Next, the carbon brush 36 according to the preferred embodiment will further be described comparing with the conventional carbon brush 90.

Figure 3B:
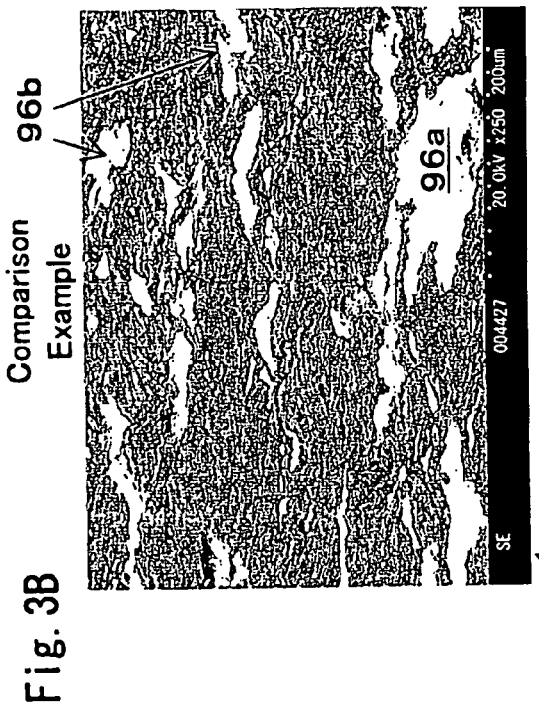
FIG. 3B is an electron microscopic picture of the cut surface of the carbon brush of a comparison example.
Figure 3D:
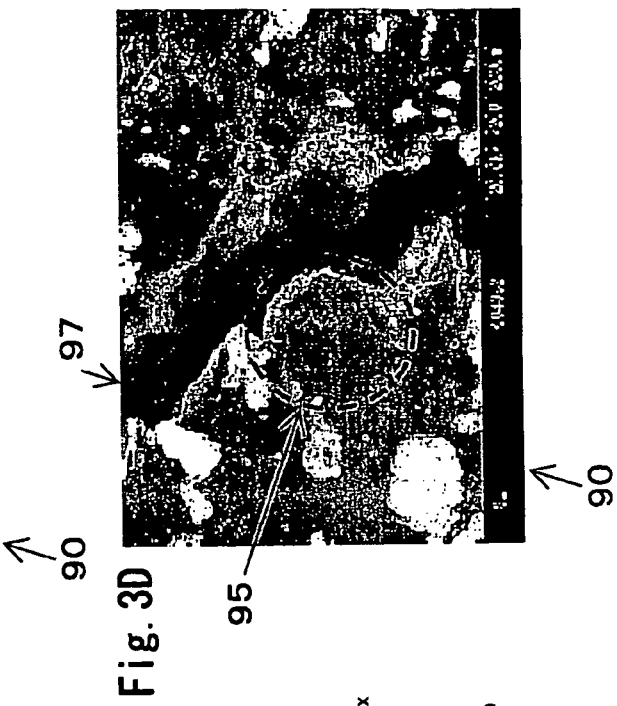
FIG. 3D is an electron microscopic picture of the cut surface of the carbon brush according to the comparison example showing a state where a crack is formed.
Figure 3A:
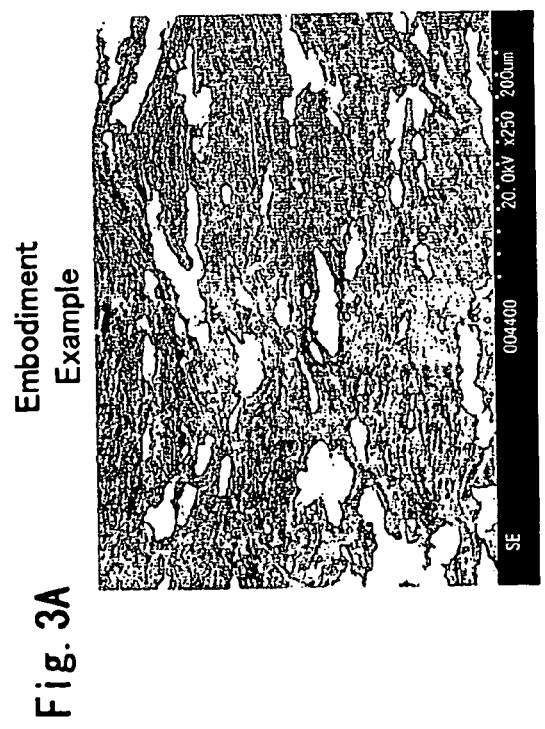
FIG. 3A is an electron microscopic picture of the cut surface of the carbon brush of an embodiment example.

FIG. 2A schematically shows the fine structure of a given cut surface of the carbon brush 36 according to the preferred embodiment. FIG. 3A shows an electron microscopic picture of the cut surface of the carbon brush 36 according to the preferred embodiment taken using a scanning electron microscope (SEM).

As shown in FIG. 2A, the carbon brush 36 is formed by sintering graphite grains 41 and the metal particles 42 in a dispersed state. Furthermore, the carbon brush 36 is preferably formed by sintering, in addition to the graphite grains 41 and the metal particles 42, particles of solid lubricant (hereinafter referred to as solid lubricant particles 43) in a dispersed state to reduce sliding friction resistance between the carbon brush 36 and the commutator 31. The carbon brush 36 is manufactured through pressure molding of the graphite grains 41, the metal particles 42, and the organic binder, and calcining of the molded product. At this time, the carbon brush 36 is preferably pressure molded with the solid lubricant particles 43 added. In the above description, sintering refers to a process in which particles are combined with one another through heat treatment during calcining, and consolidated in a shape made during the pressure molding. That is, the phrase "formed by sintering" refers to the entire process where particles are consolidated through calcining.

Fine powder of conductive metal is used for the metal particles 42 to provide high conductivity to the carbon brush 36, and fine powder of copper is preferably used. For solid lubricant particles 43, for example, fine powder of molybdenum disulfide ($MoS_2$) is used. In this embodiment example, the fine powder of copper having the average particle diameter of approximately 30 μm and the fine powder of molybdenum disulfide having the average particle diameter of approximately 1 μm are used. The organic binder is added to increase the moldability during pressure molding. The organic binder remains in the carbon brush 36 in a state carbonized through calcining.

FIG. 2B shows a state where the metal particles 42 and the solid lubricant particles 43 are removed from the schematic diagram of FIG. 2A emphasizing the dispersed state of the graphite grains 41.

As shown in FIGS. 2A and 2B, each graphite grain 41 is formed of a granulated substance of raw graphite particles 44. The raw graphite particles 44 are produced through, for example, a method in which graphitizing material is subjected to a high-temperature treatment to obtain graphitized material, and the graphitized material is then ground into powder, or a method in which graphitizing material is ground and then subjected to a high-temperature treatment to obtain graphitized material.

The raw graphite particles 44 in each graphite grain 41 are in close contact with the adjacent raw graphite particles 44 and are combined with one another with a relatively weak binding force. The relatively weak binding force is ascribable to the fact that the adjacent raw graphite particles 44 are arranged in a close contact state during sintering and are consolidated in that state.

The surface of each graphite grain 41 (granulated substance) is coated with carbide 45 (amorphous carbon) of the organic binder as shown by thick black lines in FIGS. 2A and 2B. The carbide 45 of the organic binder serves to strengthen the weak binding force among the raw graphite particles 44 forming each graphite grain 41. Furthermore, the carbide 45 of the organic binder exerts strong binding force on the surface of each graphite grain 41 to increase the strength of the entire graphite grain 41. The strong binding force means a force stronger than the relatively weak binding force among the raw graphite particles 44.

The metal particles 42 and the solid lubricant particles 43 are located on the surface of the carbides 45 of the organic binder, that is, on the surfaces of the graphite grains 41. The metal particles 42 and the solid lubricant particles 43 are combined with the carbides 45 of the organic binder with weak binding force. The weak binding force means force weaker than the strong binding force exerted by the carbide 45 of the organic binder on the surface of each graphite grain 41, and is likely to be weaker than the relatively weak binding force of the raw graphite particles 44.

As shown in FIGS. 2A and 3A, a plurality of holes 46 are formed between the graphite grains 41, the metal particles 42, and the solid lubricant particles 43 in the carbon brush 36. The holes 46 are spaces where none of the graphite grains 41, the metal particles 42, the solid lubricant particles 43, the raw graphite particles 44, and the carbides 45 of the organic binder exist.

As shown in FIGS. 9A, 9B, and FIGS. 3B, 3D, the conventional carbon brush 90 (comparison example) differs from the carbon brush 36 of the preferred embodiment in that the binder (the carbides 94) coats the surface of each raw graphite particle 91. As a result, the number of the raw graphite particles 91 included in each graphite grain 95 of the carbon brush 90 significantly varies, which results in significant variation in the particle diameter. Furthermore, in the carbon brush 90, the sizes of the holes 96a, 96b formed among the graphite grains 95, the metal particles 92, and the solid lubricant particles 93 also significantly vary. The carbon brush 90 of the comparison example includes the raw graphite particles 91 having the average particle diameter of 30 µm, the fine powder of copper having the average particle diameter of approximately 30 µm, and the fine powder of molybdenum disulfide having average particle diameter of approximately 1 µm in the same manner as the preferred embodiment.

Figure 4A:
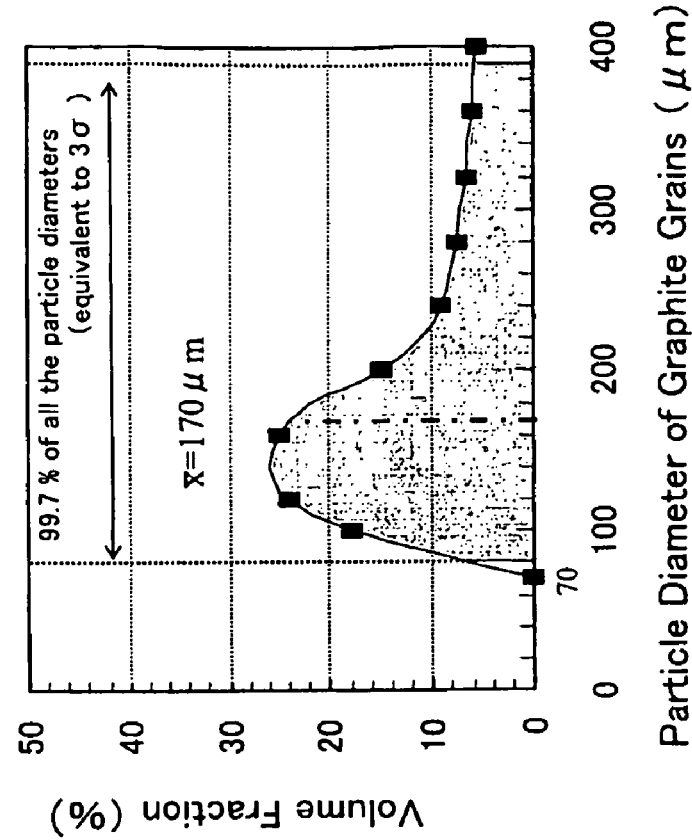
FIG. 4A is a graph showing the particle diameter distribution of the graphite grains of the carbon brush according to the embodiment example.

According to the carbon brush 36 of the preferred embodiment, the particle diameter of each graphite grain 41 is necessarily greater than the particle diameter of each raw graphite particle 44 since each graphite grain 41 includes a number of the raw graphite particles 44. The particle diameters of the graphite grains 41 are within a range of 60 to 280 µm. For example, as shown in the graph of FIG. 4A, the graphite grains 41 in the carbon brush 36 manufactured using the raw graphite particles 44 having the average particle diameter of 30 µm has a distribution of particle diameters that is substantially identical to the normal distribution within the range of the particle diameter of 40 to 300 µm, while 99.7% of all the particle diameters are within the range of 60 to 280 µm and 60% of all the particle diameters are within the range of 70 to 180 µm. Specifically, the maximum particle diameter of the graphite grain 41 is less than or equal to ten times the average particle diameter (30 µm) of the raw graphite particle 44. Furthermore, as shown in FIG. 4A, the average particle diameter of the graphite grains 41 is 140 µm, which is less than or equal to five times the average particle diameter (30 µm) of the raw graphite particles 44. The particle diameters of the graphite grains 41 are measured by detecting some of the graphite grains 41 on the SEM picture and assuming the outer shape of each graphite grain 41 as a circle or an oval. Substances corresponding to the raw graphite particles 44 are not detected on the SEM picture.

Figure 4B:
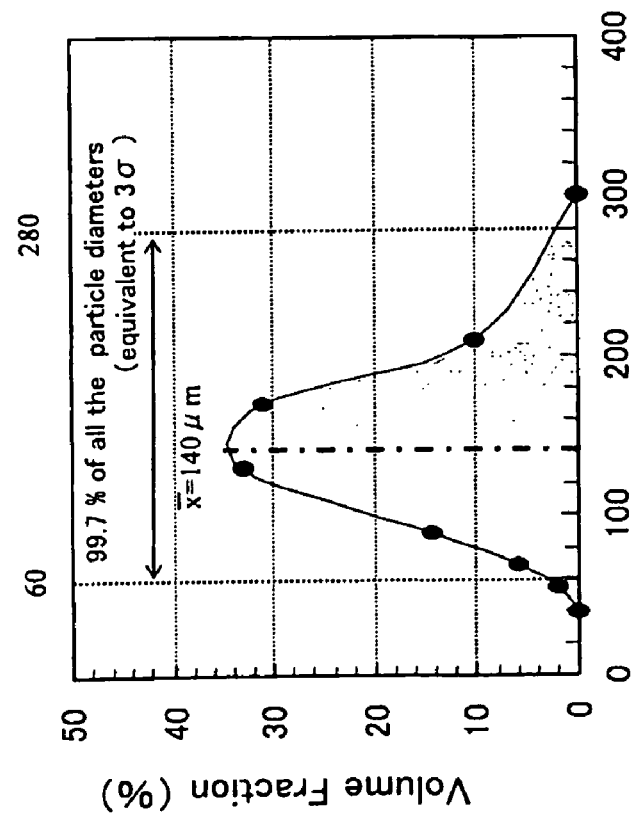
FIG. 4B is a graph showing the particle diameter distribution of the graphite grains of the carbon brush according to the comparison example.

As shown in the graph of FIG. 4B, in the case with the carbon brush 90 of the comparison example (prior art), the particle diameter of each graphite grain 95 is greater than or equal to 70 µm, and many graphite grains 95 having the particle diameter of over 400 µm are included. Furthermore, the distribution is not identical to the normal distribution. 99.7% of all the particle diameters of the graphite grains 95 is included within the range of 80 to 400 µm. In addition, the average particle diameter is 170 µm, which exceeds five times the average particle diameter (30 µm) of the raw graphite particles 91.

Figure 3C:
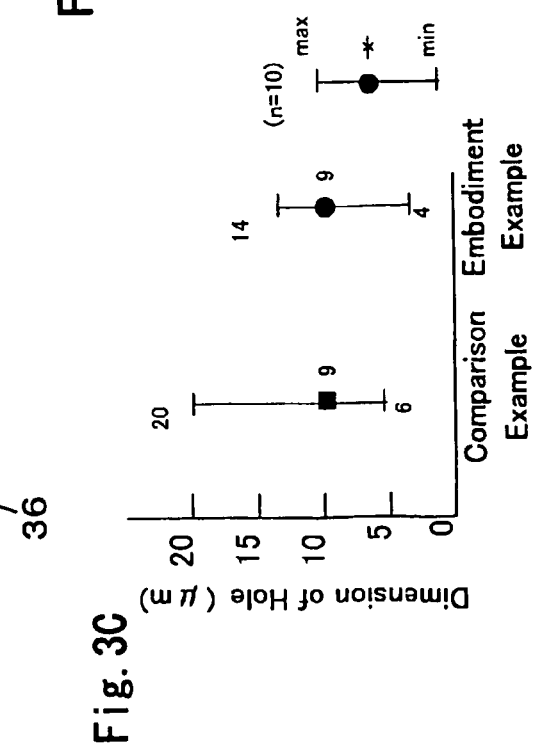
FIG. 3C is a graph showing the result of measurement of the dimensions of the holes of the carbon brush according to the embodiment example and the comparison example.

Ten largest holes are detected on the SEM picture of each of the carbon brushes according to the embodiment example and the comparison example. FIG. 3C is a graph showing the average, maximum, and minimum values of the dimension of the hole measured by obtaining the maximum dimensions of the holes. Therefore, the dimension of the hole represents the maximum value of the dimension of the hole. As shown in FIG. 3C, while the dimensions of the holes of the carbon brush 36 according to the embodiment example are distributed within the range of 4 to 14 µm and the average of the dimensions is 9 µm, the dimensions of the holes of the carbon brush 90 according to the comparison example are distributed within the range of 6 to 20 µm and the average of the dimensions is 9 µm. That is, according to the carbon brush 36 of the embodiment example, the maximum dimension (14 µm) of the hole 46 is less than or equal to half the average particle diameter (30 µm) of the raw graphite particles 44. Furthermore, variation in the size of the holes 46 is small as compared to the carbon brush 90 of the comparison example. Therefore, the carbon brush 36 of the embodiment example suppresses formation of the crack 97 and easily extends the life.

Figure 5B:
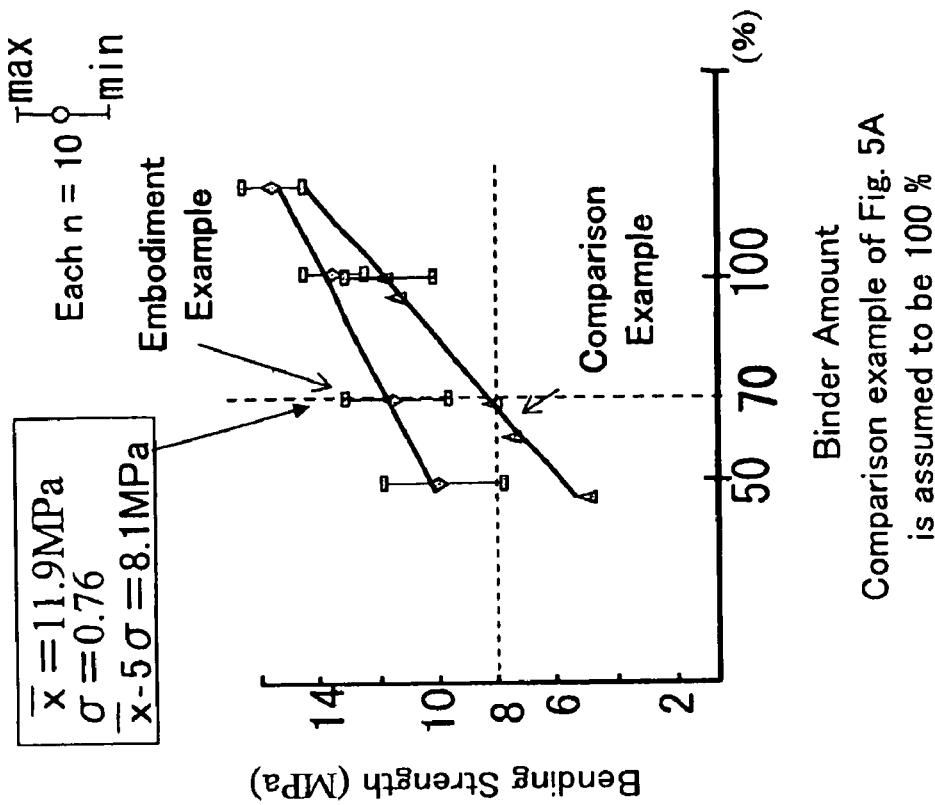
FIG. 5B a graph showing the relationship between the amount of binder added to the carbon brush according to the embodiment example and the comparison example and the bending strength.
Figure 5A:
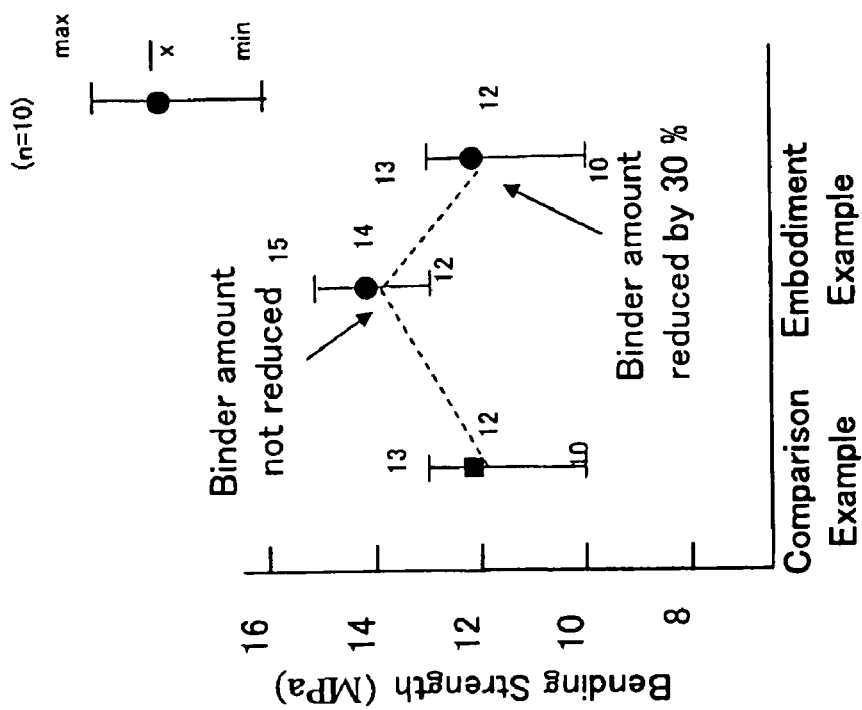
FIG. 5A is a graph showing the result of measurement of the bending strength of the carbon brush according to the embodiment example and the comparison example.

FIG. 5A is a graph showing the average, maximum, and minimum values of the bending strength of the carbon brush 36 according to the embodiment examples of FIGS. 4A and 3C (indicated as "binder amount not reduced" in the drawing), the comparison example, and another embodiment example (indicated as "binder amount reduced by 30%" in the drawing) in which the added amount of the organic binder is reduced by the mass ratio of 30% from the embodiment example. The bending strength is evaluated using a known three-point bending test. As shown in FIG. 5A, the carbon brush 36 of the embodiment example (binder amount not reduced) has a higher bending strength as compared to the carbon brush 90 of the comparison example. The increase in the bending strength causes the elastic coefficient of the carbon brush to be increased. Therefore, the embodiment example simultaneously has advantages and drawbacks, that is, while the mechanical abrasion of the carbon brush is reduced, generation of noise and unusual sound is increased.

Importantly, the bending strength of the carbon brush 36 of the another embodiment example (binder amount reduced by 30%) is equivalent to that of the conventional carbon brush 90 of the comparison example. That is, in the carbon brush manufactured by adding the organic binder, the carbide of the organic binder adheres to the segments 31a of the commutator 31 resulting in generation of vibration and sparks. Therefore, it is significantly important to reduce the binder amount to provide a high-quality carbon brush. In this regard, the carbon brush 36 of the another embodiment example (binder amount reduced by 30%) is remarkably superior to the carbon brush 90 of the comparison example.

The graph of FIG. 5B shows the result of observation on the relationship between the binder amount and the bending strength of the carbon brush in each of the embodiment example and the comparison example. As shown in FIG. 5B, the inclination of the graph of the carbon brush 36 according to the embodiment example is smaller as compared to the carbon brush 90 of the comparison example. Therefore, the variation of the binder amount has small influence on the bending strength. In particular, it is known that cracks and chips are easily made during manufacture of the carbon brush when the bending strength falls below 8 MPa. In the carbon brush 90 of the comparison example, if the binder amount is reduced by 30%, the bending strength becomes 8.1 MPa. However, in the carbon brush 36 of the embodiment example, even if the binder amount is reduced to less than or equal to 50%, the bending strength is sufficiently above 8 MPa.

Figure 6:
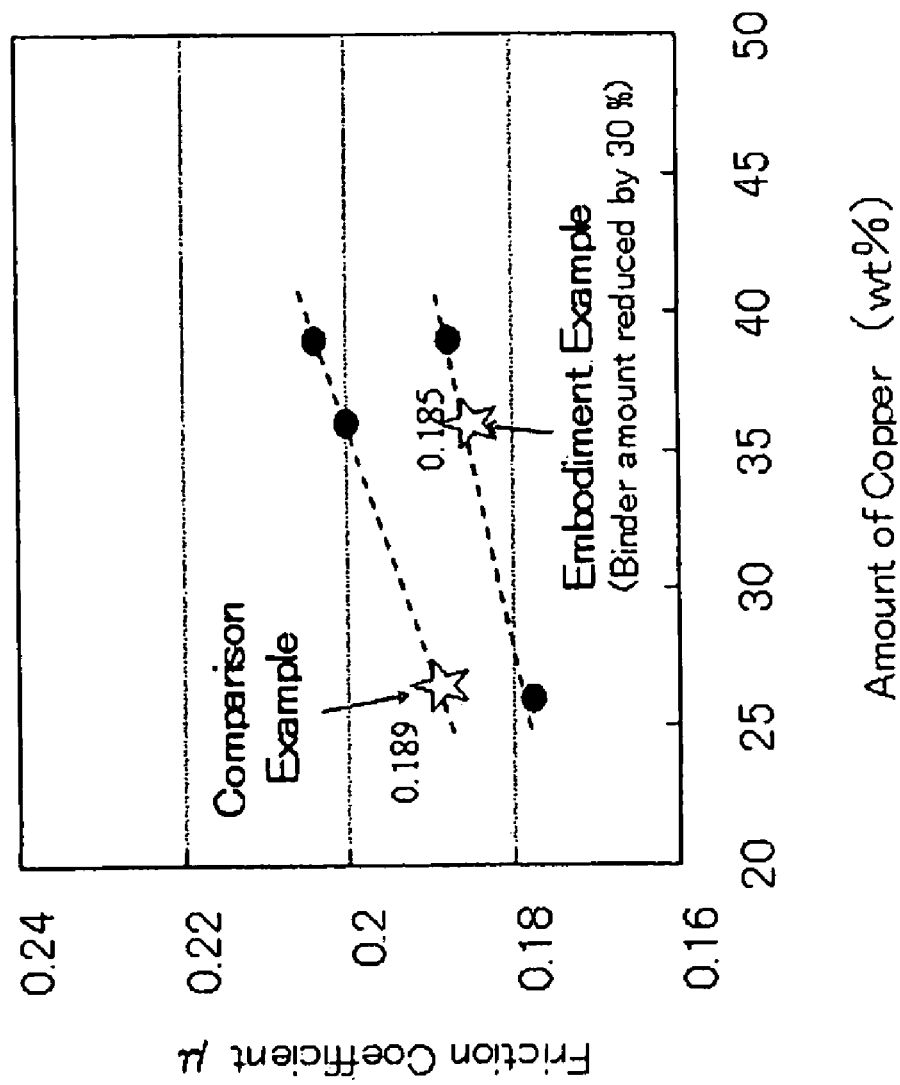
FIG. 6 is a graph showing the relationship between the amount of copper contained in the carbon brush according to the embodiment example and the comparison example and the friction coefficient μ.

FIG. 6 is a graph showing the result of measurement made using a frictional coefficient measuring instrument to show the relationship between the added amount of copper and the friction coefficient µ of the another embodiment example (binder amount reduced by 30%) and the comparison example. The test was conducted using a discrete motor of 7.5

V with no load, which was driven at the temperature of 30 to 35° C., the humidity of 1 to 3 G/m³, and the rotational speed of 1400 rpm.

As shown in FIG. 6, the friction coefficient μ of the carbon brush 36 of the embodiment example is significantly smaller than that of the comparison example including the same amount of copper and the inclination of the graph is small. Therefore, significant increase of the friction coefficient μ is easily suppressed. In FIG. 6, the carbon brush 36 of the embodiment example with 36 mass % of copper has substantially the same friction coefficient μ as the comparison example with 26 mass % of copper. Therefore, the carbon brush 36 of the embodiment example is advantageous in that the conductivity is increased as compared to the carbon brush 90 of comparison example. The upper limit of the amount of copper that can be contained in the carbon brush is generally assumed to be about 39 mass %. However, according to the carbon brush 36 of this embodiment example, even if the carbon brush 36 contains copper of 39 mass %, the carbon brush 36 has a lower friction coefficient μ than the carbon brush 36 of the comparison example containing copper of 26 mass %. That is, the carbon brush 36 of the embodiment example facilitates increasing the amount of copper while suppressing the friction resistance between the carbon brush 36 and the commutator 31. This increases the conductivity of the carbon brush, which is preferable.

Figure 7:
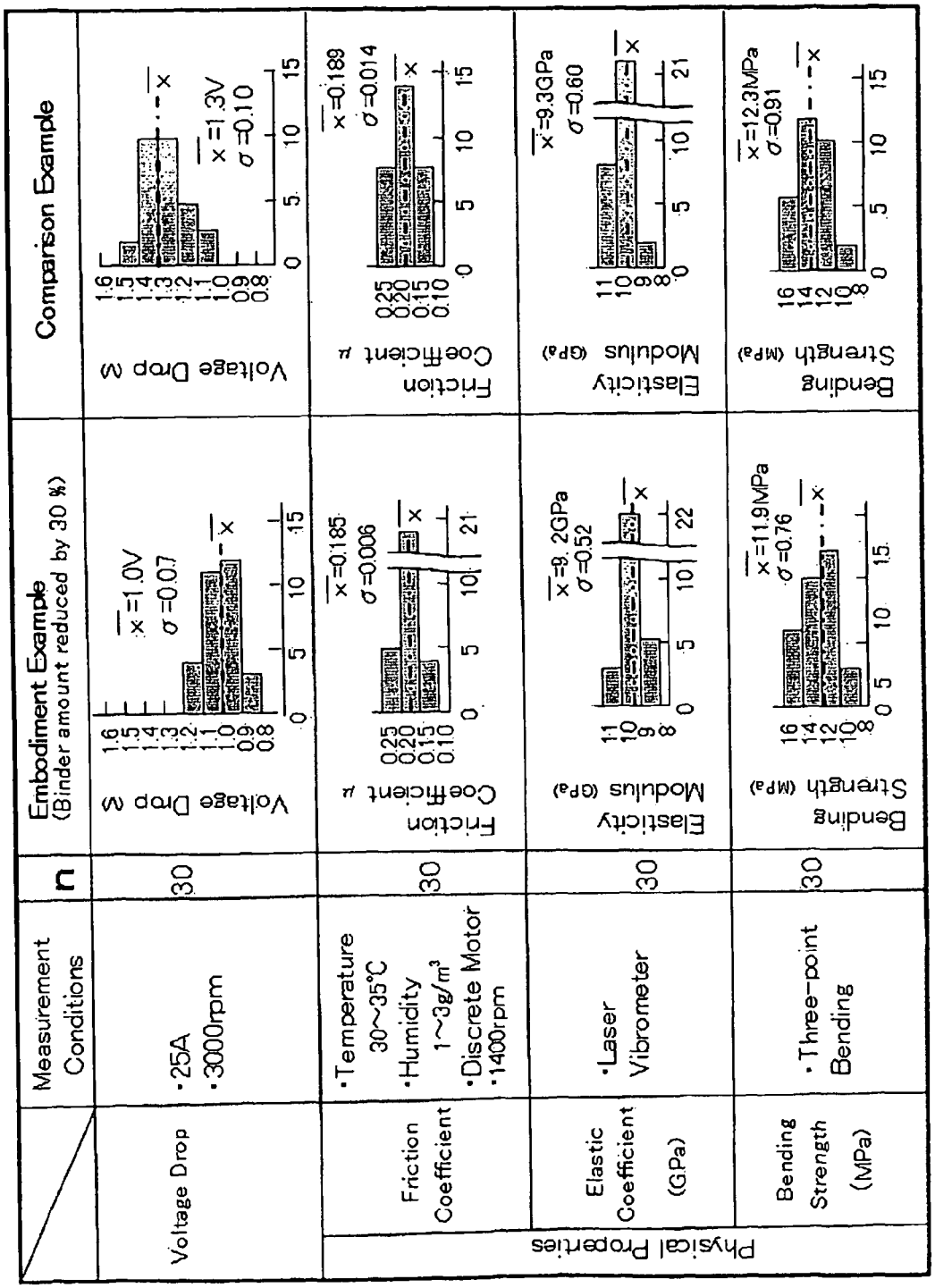
FIG. 7 is an explanatory diagram showing the result of material evaluation of the carbon brush according to the embodiment example and the comparison example.

The table of FIG. 7 shows the result of a material evaluation on the another embodiment example (binder amount reduced by 30%) and the comparison example. That is, the table includes a graph showing the result of the scaled-up measurement (number of measurement n=30) of the bending strength and the friction coefficient μ made on each of the another embodiment example and the comparison example with the distribution of measurement values. Furthermore, the table includes the measurement result of the level of the voltage drop and the measurement result of the elastic coefficient of each of the another embodiment example and the comparison example.

As shown in the table, according to the carbon brush 36 of the another embodiment example, the distribution of the measurement values of the friction coefficient μ is uniform as compared to the carbon brush 90 of the comparison example. Therefore, the friction that acts on the commutator 31 tends to be constant. Likewise, the bending strength, the elastic coefficient, and the voltage drop also tend to be constant since standard deviation a of the embodiment example is smaller than standard deviation a of the comparison example. Thus, the carbon brush 36 of the another embodiment example is superior to the carbon brush 90 of the comparison example in that the friction coefficient μ, the bending strength, the elastic coefficient, and the voltage drop always provides a desired constant performance. Furthermore, the voltage drop of the carbon brush 36 of the another embodiment example is smaller than that of the comparison example, resulting in the reduction of energy loss, which is preferable.

Among the physical properties of a carbon brush, increase of the elastic coefficient generally increases generation of noise of the direct current motor 21 and generation of unusual sound between the carbon brush and the commutator 31. Furthermore, increase of the bending strength decreases the mechanical abrasion of the carbon brush. The elastic coefficient and the bending strength has a contradictory relationship so that if the elastic coefficient is increased, the bending strength is increased. Thus, it is very difficult to suppress noise and unusual sound while simultaneously suppressing the mechanical abrasion.

Figure 8A:
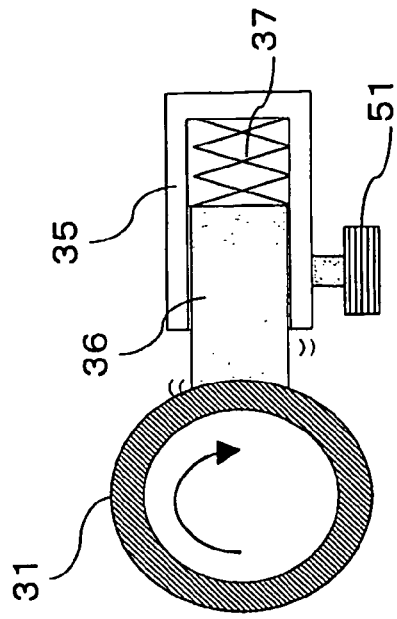
FIG. 8A is a graph showing the relationship between the binder adhered area ratio and the brush vibration of the carbon brush according to the embodiment example.

FIG. 8A is a graph showing the test result of the observation of the relationship between the binder adhered area ratio and the brush vibration of the carbon brush 36 of the embodiment example containing 36 mass % of copper and the carbon brush 90 of the comparison example containing 26 mass % of copper. For the carbon brush 36 of the embodiment example, tests were conducted on three types of the carbon brush 36, that is, the carbon brush 36 in which the binder amount was reduced by 30%, the binder amount was not reduced, and the binder amount was increased by 30%.

Figure 8B:
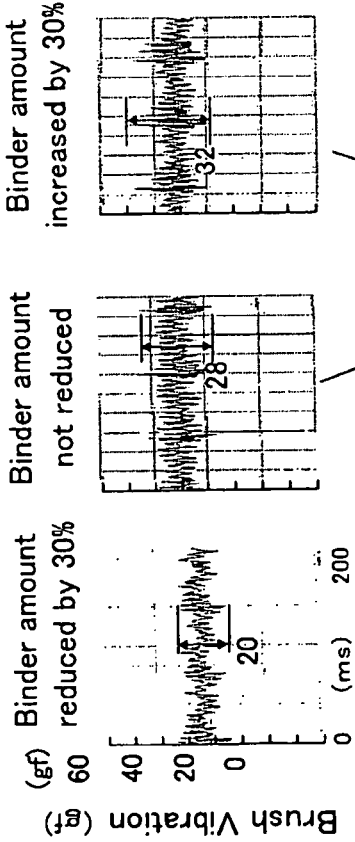
FIG. 8B is a schematic diagram illustrating part of a measuring device for measuring the brush vibration.

The tests were carried out using a measurement device equipped with a load converter 51 (see FIG. 8B) located on one side of one of the brush holders 35 of the direct current motor 21. The load converter 51 is a device for detecting vibration of the brush holder 35 generated when the armature 25 is rotated. The vibration is recorded as a waveform as shown in FIG. 8A. The vibration indicating the maximum amplitude was obtained from the waveform shown in FIG. 8A, which was then plotted as the brush vibration in FIG. 8A.

After operating the direct current motor 21 at 1400 rpm for 250 hours under an environment where the temperature is 30 to 35° C. and the humidity is 1 to 3 g/m³, the binder adhered area ratio was obtained through carbon mapping on the surface of the segment 31a of the commutator 31 using Raman spectroscopy, and then measuring the distribution area of the amorphous carbon. The carbon brush includes two types of carbon, which are carbon made of crystal of graphite and amorphous carbon made of carbides of the organic binder. The Raman spectroscopy is a method for detecting the amorphous carbon.

As shown in FIG. 8A, according to the carbon brush 36 of the embodiment example, as the binder adhered area ratio is reduced, the brush vibration is reduced. Furthermore, in FIG. 8A, according to the carbon brush 36 of the embodiment example, the binder adhered area ratio is increased in proportion to the binder amount. Therefore, according to the carbon brush 36 of the embodiment example, the brush vibration is increased in proportion to the binder amount added during manufacture. In a case with the carbon brush 90 of the comparison example, since the added amount of copper is as low as 26 mass %, the brush vibration is slightly smaller than that of the embodiment example (binder not reduced). However, if the content of the metal particles 92 is increased to, for example, 36 mass %, the friction coefficient μ is increased, which causes the brush vibration to be greater than that of the embodiment example (binder not reduced).

Figure 8C:
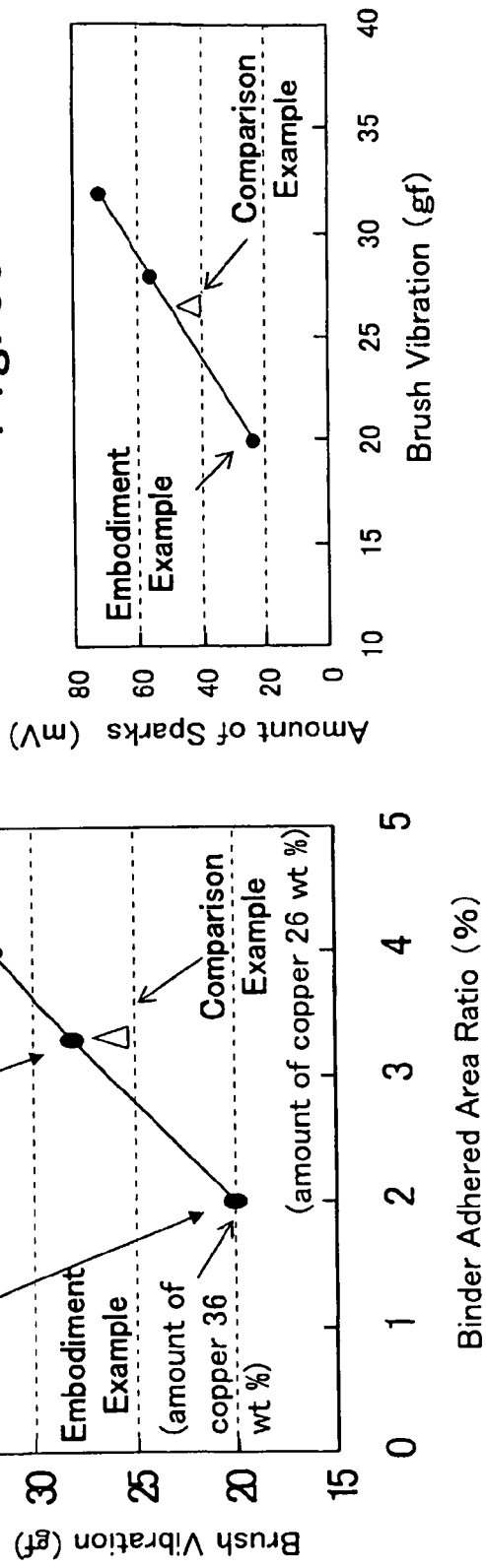
FIG. 8C is a graph showing the relationship between the brush vibration and the spark amount of the carbon brush according to the embodiment example.

FIG. 8C is a graph showing the result of a test performed simultaneously as when the test result shown in FIG. 8A was obtained, and shows the relationship between the brush vibration and amount of sparks. As shown in FIG. 8C, as the brush vibration is increased, the amount of sparks increases. That is, since the carbide of the organic binder is amorphous and has an activating structure, the carbide of the organic binder adheres to the commutator 31 more easily than graphite. When the carbide of the organic binder adheres to the commutator 31, the brush vibration is increased and the amount of sparks is increased. The increase of the amount of sparks generally causes spark abrasion on the carbon brush and shortens the life. However, according to the carbon brush 36 of this embodiment, since the added amount of the organic binder is easily reduced, generation of brush vibration and sparks is easily suppressed.

The preferred embodiment has the following advantages.

(1) According to the carbon brush 36 of the preferred embodiment, the particle diameters of the graphite grains 41 are uniform as compared to that of the conventional carbon brush 90. This facilitates dispersing the metal particles 42 more uniformly. As a result, the conductivity of the carbon brush 36 is increased and the voltage drop is easily reduced. Furthermore, since the graphite grains 41 and the metal particles 42 uniformly slide against the commutator 31, the sliding resistance against the commutator 31 is reduced, and partial wear of the carbon brush 36 and the segments 31a is easily reduced.

(2) According to the carbon brush 36 of the preferred embodiment, the sizes of the holes 46 are small and uniform as compared to that of the conventional carbon brush 90. Therefore, cracks are not easily formed and defect of the carbon brush 36 is easily suppressed. Furthermore, since particles in the carbon brush 36 are arranged in close contact with one another, the structure becomes dense thereby easily increasing the strength of the carbon brush 36. The increase in the strength of the carbon brush 36 facilitates reducing the added amount of the organic binder. The sizes of the holes 46 are uniform since the particle diameters of the graphite grains 41 are uniform.

(3) According to the carbon brush 36 of the preferred embodiment, each graphite grain 41 is formed of the granulated substance of the raw graphite particles 44, the surface of which is coated with the carbide 45 of the organic binder. In contrast, each conventional graphite grain 95 includes a number of the raw graphite particles 91, and the surface of each raw graphite particle 91 is coated with the carbide 94 of the organic binder. Therefore, the amount of the organic binder necessary for the unit volume of the raw graphite particle 44 of the graphite grain 41 of the preferred embodiment is smaller than that of the conventional graphite grain 95. Furthermore, in the carbon brush 36 of the preferred embodiment, the amount of the carbides 45 of the organic binder that remains after the manufacture is reduced as compared to the conventional carbon brush 90. This facilitates solving problems such as increase of the friction coefficient μ, increase of vibration, and generation of sparks.

(4) In the carbon brushes 36 of this embodiment, the particle diameter of each graphite grain 41 is within the range of 60 to 280 μm. It is preferable that the particle diameters of all the graphite grains 41 are in the range of 60 to 280 μm. However, the level of significance may be less than 5%, preferably less than 1%, and more preferably less than or equal to 0.3%. Therefore, in the carbon brush 36, the variation of the particle diameters of the graphite grains 41 is significantly small, and the graphite grains 41 and the metal particles are reliably dispersed uniformly. As a result, the electrical transmission property and sliding property of the carbon brushes 36 are improved. Accordingly, the voltage is prevented from lowering, and the sliding friction resistance between the carbon brushes 36 and a commutator is reduced. Further, the reduction of the sliding friction resistance reduces noise and suppresses defects of the carbon brushes 36 and occurrence of cracks, thereby extending the life of the carbon brushes 36.

Further, in the carbon brushes 36 of this embodiment, since the maximum particle diameter of the graphite grains 41 is less than or equal to ten times the average particle diameter of the raw graphite particles 44, the particle diameter of each graphite grain 41 is less than or equal to ten times the average particle diameter of the raw graphite particles 44. It is preferable that the particle diameters of all the graphite grains 41 are equal to or less than ten times the average particle diameter of the raw graphite particles 44. However, the level of significance may be less than 5%, preferably less than 1%, and more preferably less than or equal to 0.3%. In addition, the average particle diameter of the graphite grain 41 is equal to or less than five times the average particle diameter of the raw graphite particles 44. These configurations have the same advantages as the case where the particle diameters of the graphite grains 41 are in a predetermined range.

(5) In the carbon brushes 36 of this embodiment, the surface of each graphite grain 41 is coated with amorphous carbon. The amorphous carbon serves to bind a plurality of raw graphite particles 44 into a graphite grain 41, thereby increasing the strength of the graphite grain 41. Further, during the manufacture of the carbon brushes 36, the organic binder, which is the raw material for the amorphous carbon, equalizes the number of the raw graphite particles 44 among the graphite grains 41, thereby contributing to the uniform particle diameters of the graphite grains 41.

In addition, the amorphous carbon exists only on the surface of the graphite grains 41. This decreases the ratio of the amorphous carbon in each carbon brush 36. Accordingly, the contents of important components related to the electrical transmission property and sliding property of the carbon brush 36 are easily increased. In each graphite grain 41, a number of raw graphite particles 44 are collectively coated with the amorphous carbon. Thus, each graphite grain 41 has a sufficiently high strength. Further, the carbon brushes 36 easily reduce adverse influence of the amorphous carbon, and suppress occurrence of vibration and sparks.

(6) In each carbon brush 36 of this embodiment, the dimension of each hole formed therein is equal to or less than half the average particle diameter of the raw graphite particles 44. It is preferable that the sizes of all the holes are equal to or less than half the average particle diameter of the raw graphite particles 44. However, the level of significance may be less than 5%, preferably less than 1%, and more preferably less than or equal to 0.3%. This reduces the occurrence of cracks and thus prevents the carbon brushes 36 from being damaged. Accordingly, the life of the carbon brushes 36 is extended. Furthermore, since the particles in each carbon brush 36 are arranged in close contact with one another, the structure becomes dense thereby easily increasing the strength of the carbon brush 36.

(7) Since the direct current motor 21 of this embodiment has the carbon brushes 36, which reduces voltage drop and suppresses frictional noise while extending the life, voltage drop is reduced, and frictional noise is suppressed, while the life of the motor 21 is extended.

The preferred embodiment may be modified as described below.

The organic binder added during pressure molding to improve the moldability may be eliminated during calcining. In this case also, variation of the particle diameters of the graphite grains 41 included in the carbon brush 36 is easily suppressed. Furthermore, since the surface of each graphite grain 41 is coated with the organic binder during manufacture and the adjacent raw graphite particles 44 are arranged in close contact with one another during sintering, the binding force of the adjacent raw graphite particles 44 (the relatively weak binding force) is sufficiently increased.

The carbon brush 36 may be provided in a rotating electrical machine other than the direct current motor 21. Alternatively, the carbon brush 36 may be applied to an electrode used in an electric device other than the rotating electrical machine.

The invention claimed is:

1. A carbon brush comprising graphite grains and metal particles, the graphite grains and metal particles being sintered in a dispersed state,
   wherein the graphite grains are each formed of granulated substance of raw graphite particles, wherein a surface of each of the raw graphite particles in each graphite grain is in directly close contact with a surface of each of the adjacent raw graphite particles, wherein a number of the raw graphite particles in each graphite grain are collectively coated with amorphous carbon, wherein such amorphous carbon exists only on the surface of the graphite grains, wherein the particle diameter of each graphite grain is within a range of 60 to 280 μm, and wherein the carbon brush has a plurality of holes, dimensions of the holes being distributed within a range of 4 to 14 μm.

2. The carbon brush according to claim 1, wherein an average of the dimensions of the holes is 9 μm.

3. A carbon brush comprising graphite grains and metal particles, the graphite grains and metal particles being sintered in a dispersed state, wherein the graphite, grains are each formed of granulated substance of raw graphite particles, wherein a surface of each of the raw graphite particles in each graphite grain is in directly close contact with a surface of each of the adjacent raw graphite particles, wherein a number of the raw graphite particles in each graphite grain are collectively coated with amorphous carbon, wherein such amorphous carbon exists only on the surface of the graphite grains, wherein the particle diameter of each graphite grain is less than or equal to ten times the average particle diameter of the raw graphite particles, and wherein the carbon brush has a plurality of holes, dimensions of the holes being distributed within a range of 4 to 14 μm.

4. The carbon brush according to claim 3, wherein an average of the dimensions of the holes is 9 μm.

5. A carbon brush comprising graphite grains and metal particles, the graphite grains and metal particles being sintered in a dispersed state, wherein the graphite grains are each formed of granulated substance of raw graphite particles, wherein a surface of each of the raw graphite particles in each graphite grain is in directly close contact with a surface of each of the adjacent raw graphite particles, wherein a number of the raw graphite particles in each graphite grain are collectively coated with amorphous carbon, wherein such amorphous carbon exists only on the surface of the graphite grains, wherein the average particle diameter of the graphite grain is less than or equal to five times the average particle diameter of the raw graphite particles, and wherein the carbon brush has a plurality of holes, dimensions of the holes being distributed within a range of 4 to 14 μm.

6. The carbon brush according to claim 5, wherein an average of the dimensions of the holes is 9 μm.

7. A carbon brush comprising graphite grains and metal particles, the graphite grains and metal particles being sintered in a dispersed state, wherein the graphite grains are each formed of granulated substance in which raw graphite particles are bound together, wherein a surface of each of the raw graphite particles in each graphite grain is in directly close contact with a surface of each of the adjacent raw graphite particles, wherein a number of the raw graphite particles in each graphite grain are collectively coated with amorphous carbon, wherein such amorphous carbon exists only on the surface of the graphite grains, wherein the carbon brush has holes, dimensions of the holes being distributed within a range of 4 to 14 μm.

8. The carbon brush according to claim 7, wherein an average of the dimensions of the holes is 9 μm.

9. A rotating electrical machine comprising a carbon brush comprising graphite grains and metal particles, the graphite grains and metal particles being sintered in a dispersed state, wherein the graphite grains are each formed of granulated substance of raw graphite particles, wherein a surface of each of the raw graphite particles in each graphite grain is in directly close contact with a surface of each of the adjacent raw graphite particles, wherein a number of the raw graphite particles in each graphite grain are collectively coated with amorphous carbon, wherein such amorphous carbon exists only on the surface of the graphite grains, wherein the particle diameter of each graphite grain is within a range of 60 to 280 μm and wherein the carbon brush has a plurality of holes, dimensions of the holes being distributed within a range of 4 to 14 μm.

10. A rotating electrical machine comprising a carbon brush comprising graphite grains and metal particles, the graphite grains and metal particles being sintered in a dispersed state, wherein the graphite grains are each formed of granulated substance of raw graphite particles, wherein a surface of each of the raw graphite particles in each graphite is in directly close contact with a surface of each of the adjacent raw graphite particles, wherein a number of the raw graphite particles in each graphite grain are collectively coated with amorphous carbon, wherein such amorphous carbon exists only on the surface of the graphite grains, wherein the particle diameter of each graphite grain is less than or equal to ten times the average particle diameter of the raw graphite particles, and wherein the carbon brush has a plurality of holes, dimensions of the holes being distributed within a range of 4 to 14 μm.

11. The rotating electrical machine according to claim 10, wherein an average of the dimensions of the holes is 9 μm.

12. A rotating electrical machine comprising a carbon brush comprising graphite grains and metal particles, the graphite grains and metal particles being sintered in a dispersed state, wherein the graphite grains are each formed of granulated substance of raw graphite particles, wherein a surface of each of the raw graphite particles in each graphite is in directly close contact with a surface of each of the adjacent raw graphite particles, wherein a number of the raw graphite particles in each graphite grain are collectively coated with amorphous carbon, wherein such amorphous carbon exists only on the surface of the graphite grains, wherein the average particle diameter of the graphite grain is less than or equal to five times the average particle diameter of the raw graphite particles, and wherein the carbon brush has a plurality of holes, dimensions of the holes being distributed within a range of 4 to 14 μm.

13. The rotating electrical machines according to claim 12, wherein an average of the dimensions of the holes is 9 μm.

14. A rotating electrical machine comprising a carbon brush comprising graphite grains and metal particles, the graphite grains and metal particles being sintered in a dispersed state, wherein the graphite grains are each formed of granulated substance in which raw graphite particles are bound together, wherein a surface of each of the raw graphite particles in each graphite grain is in directly close contact with the adjacent raw graphite particles, wherein a number of the raw graphite particles in each graphite grain are collectively coated with amorphous carbon, wherein such amorphous carbon exists only on the surface of the graphite grains, and wherein the carbon brush has a plurality of holes, dimensions of the holes being distributed within a range of 4 to 14 μm.

15. The rotating electrical machine according to claim 14, wherein an average of the dimensions of the holes is 9 μm.

* * * * *